Patented Mar. 11, 1930

1,750,301

UNITED STATES PATENT OFFICE

ROBERT R. FULTON, OF WILKINSBURG, PENNSYLVANIA, ASSIGNOR TO WESTINGHOUSE ELECTRIC & MANUFACTURING COMPANY, A CORPORATION OF PENNSYLVANIA

WELDING FLUX

No Drawing.  Application filed September 16, 1926. Serial No. 135,997.

My invention relates to the art of joining like and unlike metals and has specific reference to welding fluxes.

Flux comprised of compounds and alloys with borax is commonly used in the process of welding for carrying off the non-weldable materials. The fluxes formerly provided for welding purposes decrepitate or swell when subjected to heat. This action caused the flux to force itself away from the point at which the weld was to be made and thus nullified the fluxing action. As can readily be understood, this was a distinct disadvantage.

The object of my invention is to provide a welding flux which does not decrepitate when heated, that has a low melting point and effectually dissolves and removes oxides adhering to the surfaces of the metal to be joined.

My invention contemplates utilizing high melting scavenging or fluxing metallic materials of which ferrosilicon and manganese are examples. These materials operate successfully as eliminators of non-weldable constituents of iron provided the weld is formed at a sufficiently high temperature, but as low temperatures as possible are desired in welding in order to prevent deterioration of the metal. Therefore, I provide a copper-silicon alloy which has a lower melting point than either manganese or ferro-silicon and which operates to combine with manganese and ferro-silicon when heated. The foregoing constituents may be considered as high temperature fluxes as they operate to flux or clean the surface to be joined only when they are raised to a comparatively high temperature.

However, some of the non-weldable materials on the surface of iron are more advantageously removed or eliminated by a low temperature fluxing material such as borax compounds or sodium phosphate. In my composition, I prefer to add ammonium borate as it is an efficient low-melting oxide-eliminator and it does not foam or decrepitate when it is heated. The ammonium borate dissolves oxides from the surfaces of the metals that are to be welded and from the surfaces of the high melting fluxing materials and thereby causes all the materials concerned in the welding operation to readily unite with each other.

The ammonium borate does not decrepitate when heated and therefore does not force the particles of flux away from the surfaces to be welded. The copper silicon alloy has a low melting point and it readily combines with the ferro-silicon and manganese thereby producing a flux having a melting point at or below that of the metals to be welded. Consequently, the flux is in a molten state before the melting point of the metal to be welded is reached.

I prefer a flux composed of 10 parts, by weight, of an alloy consisting of 92% copper, 7% silicon and 1% iron, 50 parts, by weight, of ammonium borate, 6 parts, by weight, of manganese metal and 24 parts, by weight, of 50% ferro-silicon alloy. The materials are powdered to 20 mesh or finer, thoroughly mixed and then applied to the surfaces of the metal in the manner well known in the art.

The proportions given may be varied to a considerable degree without materially affecting the efficiency of the flux. The 1% of iron in the copper silicon iron alloy is not essential. Ammonium borate alone is an excellent flux for brazing or any kind of welding. It is easily removed with hot water, which is not true of borax.

I do not wish to be limited to the particular formula set forth, as considerable variation of the preferred ingredients and proportions may be made without seriously affecting the efficiency of the flux or departing from the spirit and scope of my invention as defined in the appended claims.

I claim as my invention:

1. Welding flux containing a copper silicon alloy and a substantial amount of ammonium borate.

2. Welding flux containing a substantial amount of ammonium borate, a copper silicon alloy and an oxidizing metal.

3. Welding flux comprising copper silicon alloy, a substantial amount of a nondecrepitating compound of boron and a plurality of oxidizing metals.

4. A composition of matter comprising an alloy of copper silicon and iron, a substantial amount of ammonium borate, manganese metal and ferro-silicon.

5. Welding flux comprising fluxing materials having relatively high melting point and a substantial amount of a fluxing material having a relatively low melting point, said high melting flux consisting of a mixture of a metal and one or more alloys containing copper, silicon and iron and said low melting flux being a nondecrepitating salt of boron.

6. A composition of matter comprising an alloy containing 92% copper, 7% silicon and minor impurities, ammonium borate, manganese and ferro-silicon in substantially the proportions of 10 parts of said copper alloy, 50 parts of ammonium borate, 6 parts manganese and 24 parts of ferro-silicon.

7. A composition of matter comprising a copper-silicon alloy, consisting of 92% copper, 7% silicon and 1% iron, ammonium borate, manganese metal and ferro-silicon in substantially the proportions of 10 parts of the copper-silicon iron alloy, 50 parts of ammonium borate, 6 parts of manganese metal and 24 parts of ferro-silicon.

8. A composition of matter comprising an alloy of copper, silicon and iron, ammonium borate, manganese metal and a ferro-silicon alloy in substantially the proportions of 10 parts of copper silicon alloy containing 85 to 95% copper and 4 to 10% silicon, 50 parts ammonium borate, 6 parts of manganese metal and 24 parts of ferro-silicon alloy containing 50 to 70% silicon.

9. A welding flux containing a major proportion of ammonium borate and a substantial proportion of metals, including an alloy of copper and silicon, an alloy of iron and silicon, and a manganese metal.

10. A welding flux comprising a substantial amount of ammonium borate, an oxidizing metal and a sufficient amount of a copper-silicon alloy to reduce the melting point of the oxidizing metal below the melting point of the metal to be welded.

In testimony whereof, I have hereunto subscribed my name this 3rd day of September 1926.

ROBERT R. FULTON.